Figure 10:
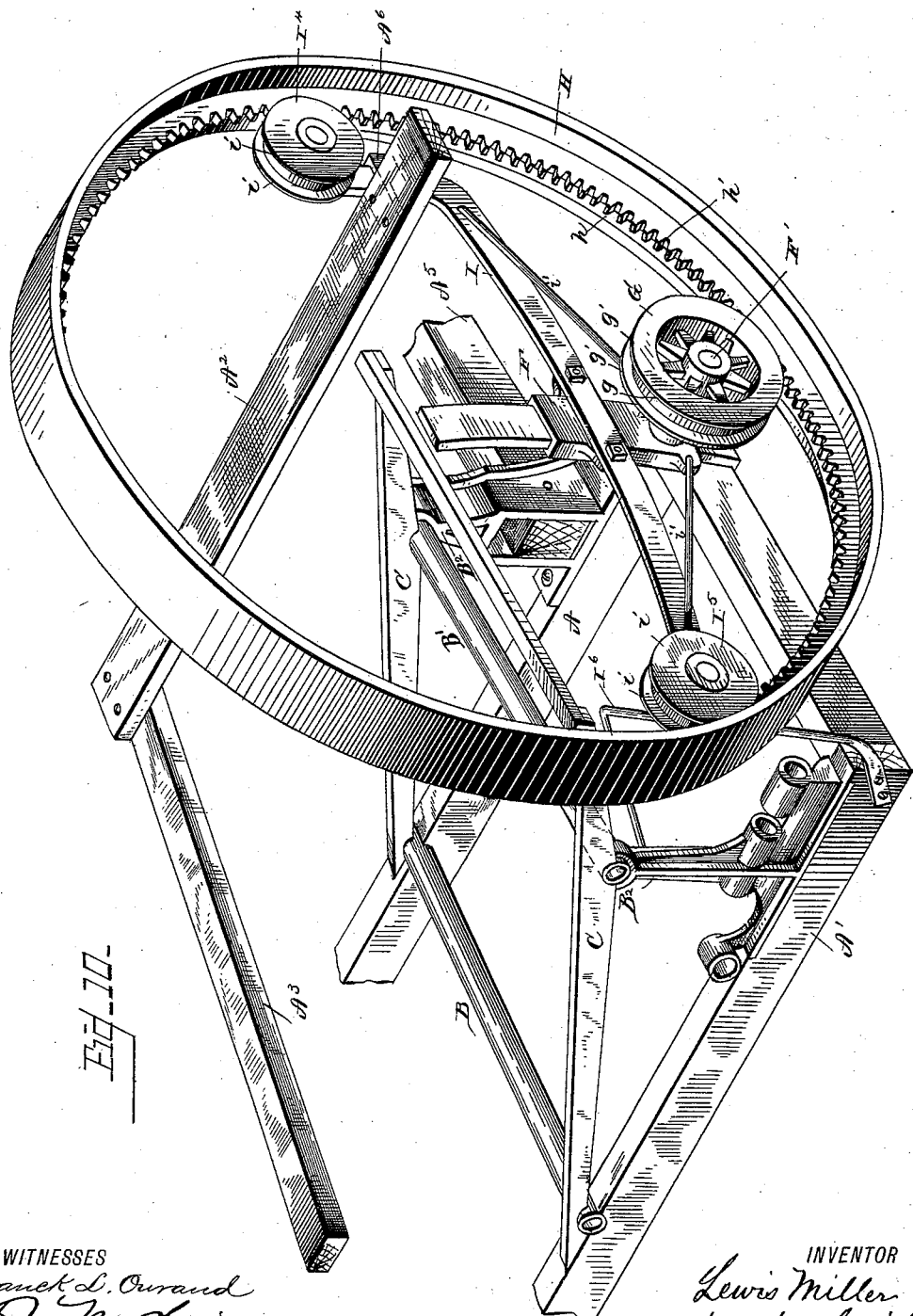

(No Model.) 5 Sheets—Sheet 1.
L. MILLER.
GRAIN BINDING HARVESTER.
No. 530,194. Patented Dec. 4, 1894.
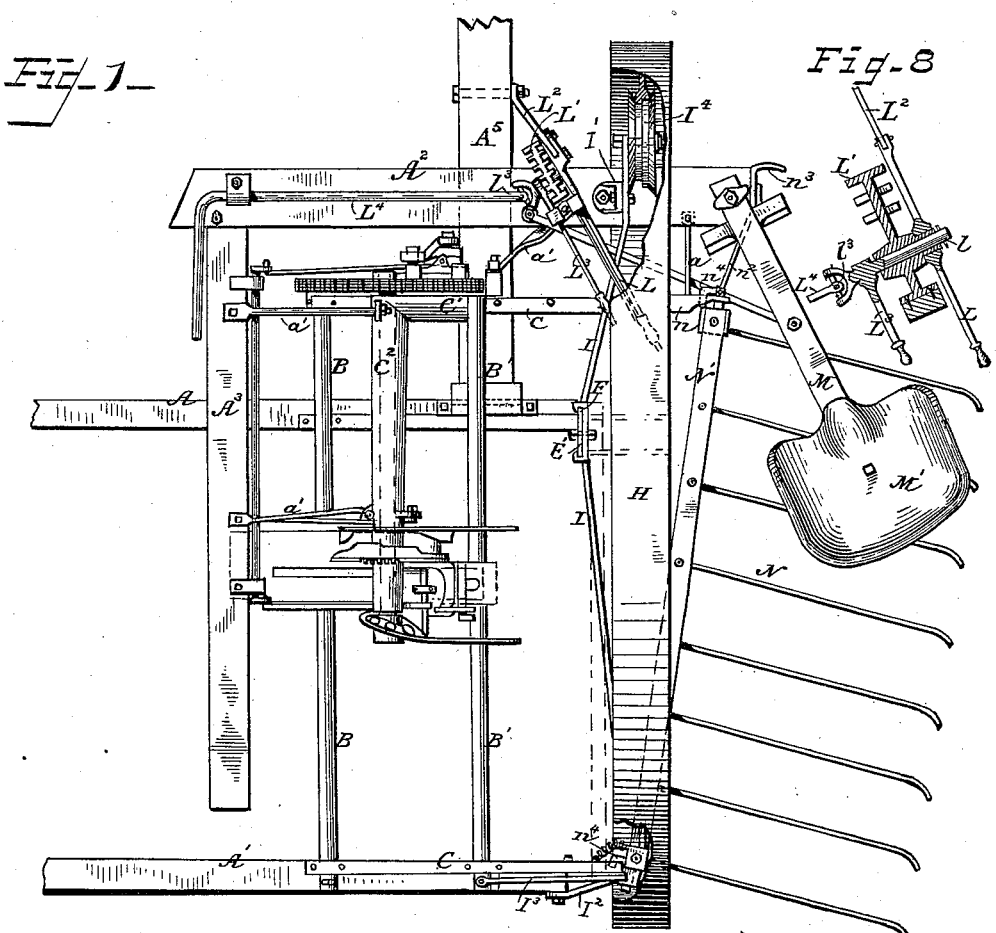
WITNESSES
INVENTOR
Lewis Miller
by Attorney.

(No Model.)  5 Sheets—Sheet 2.
L. MILLER.
GRAIN BINDING HARVESTER.
No. 530,194.  Patented Dec. 4, 1894.
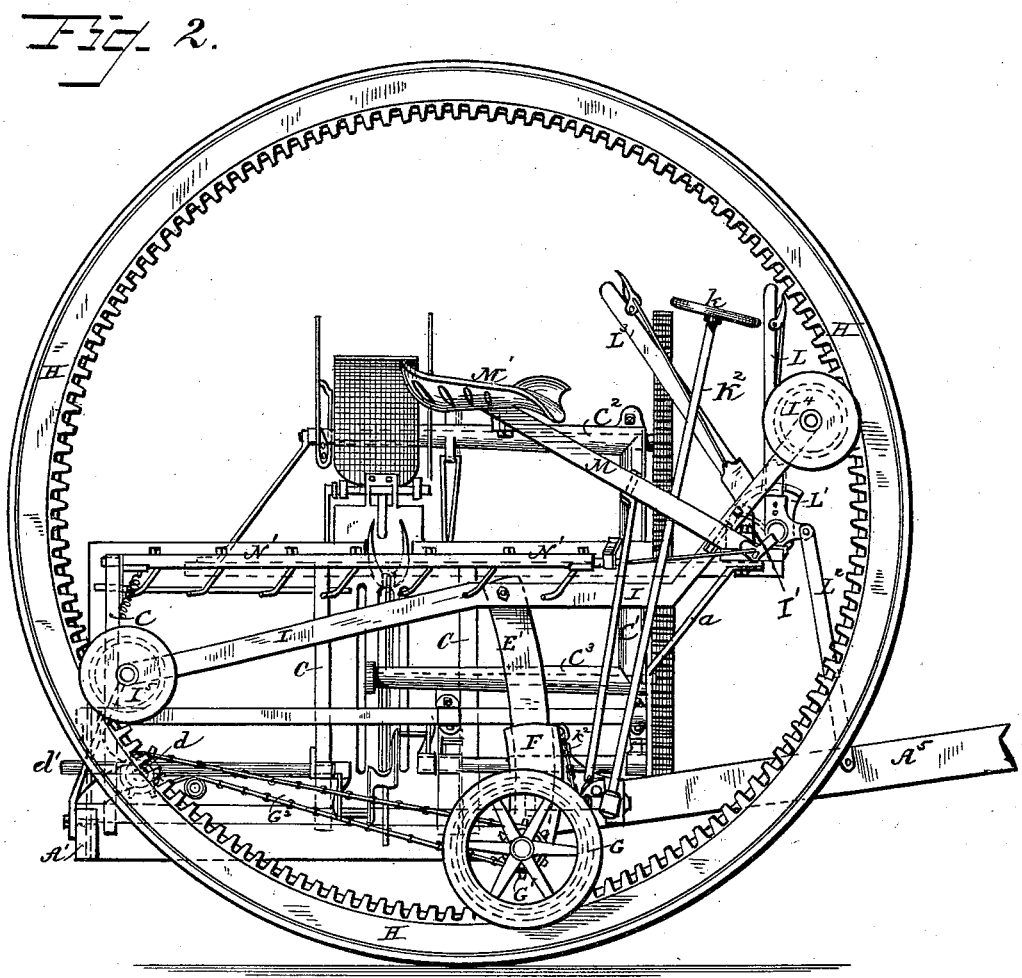
WITNESSES
INVENTOR.
Lewis Miller
Attorney.

(No Model.) 5 Sheets—Sheet 3.
L. MILLER.
GRAIN BINDING HARVESTER.
No. 530,194. Patented Dec. 4, 1894.
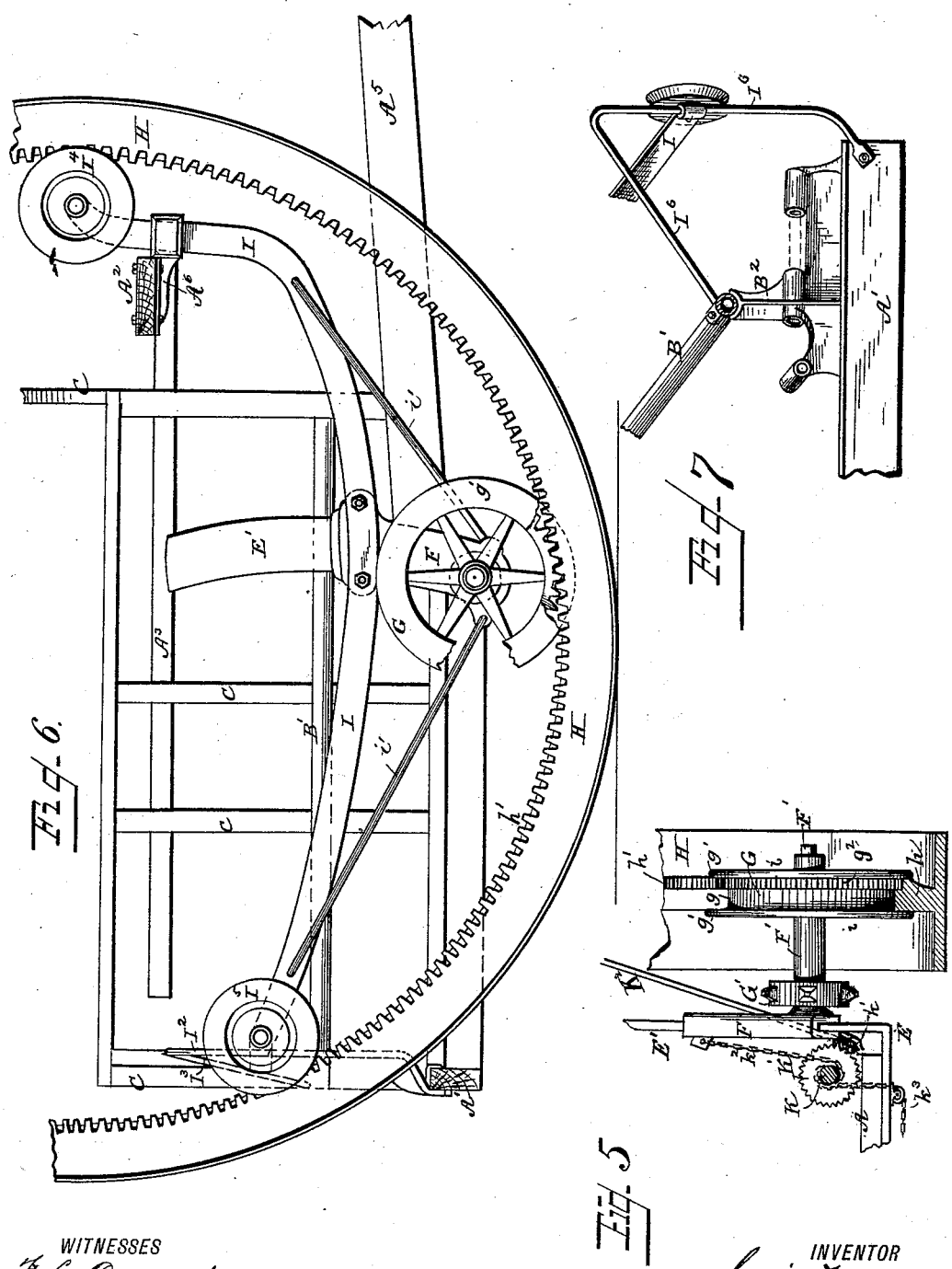

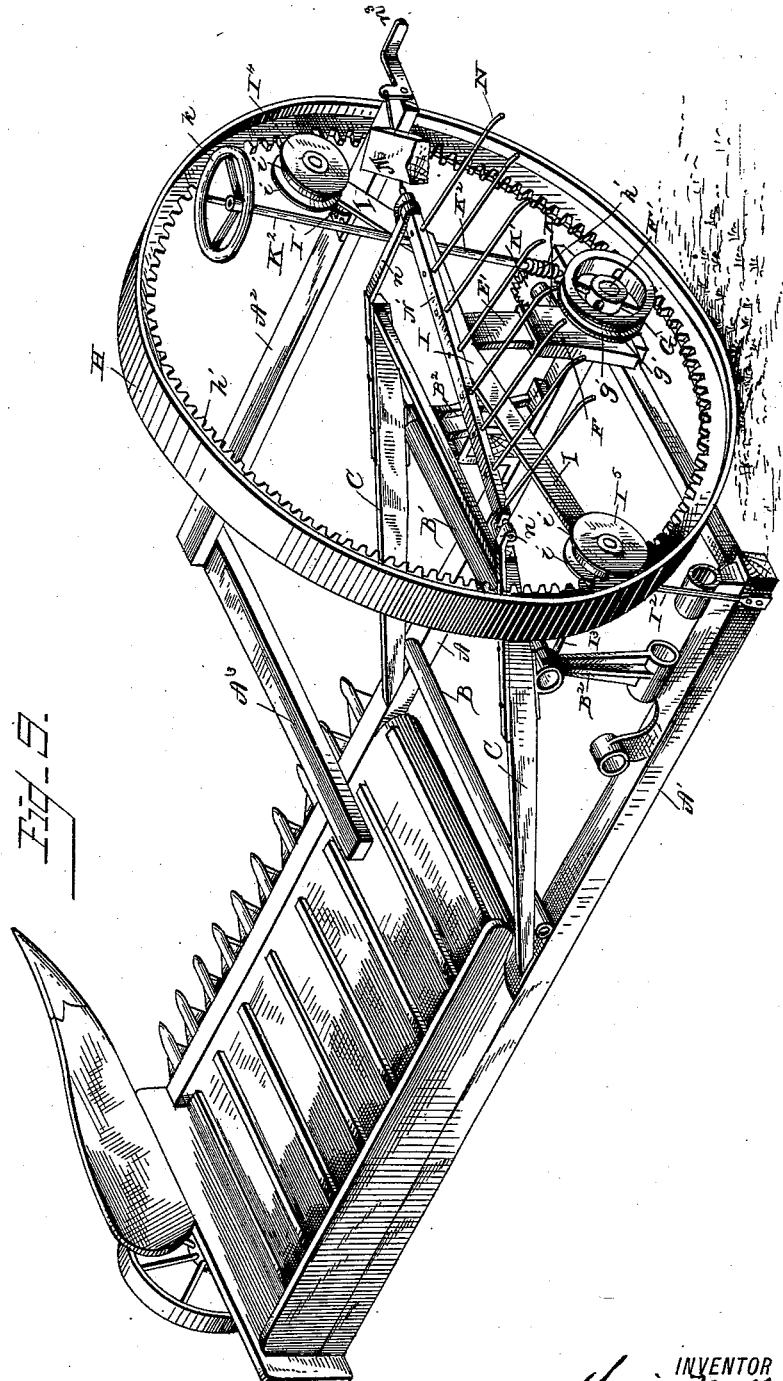

(No Model.) 5 Sheets—Sheet 5.

L. MILLER.
GRAIN BINDING HARVESTER.

No. 530,194. Patented Dec. 4, 1894.

WITNESSES
Franck L. Ourand
Rex M. Smith

INVENTOR
Lewis Miller
by A. M. Smith
Attorney

UNITED STATES PATENT OFFICE.

LEWIS MILLER, OF AKRON, OHIO.

GRAIN-BINDING HARVESTER.

SPECIFICATION forming part of Letters Patent No. 530,194, dated December 4, 1894.

Application filed June 16, 1883. Serial No. 98,310. (No model.)

*To all whom it may concern:*

Be it known that I, LEWIS MILLER, of Akron, county of Summit, and State of Ohio, have invented a new and useful Improvement in Grain-Binding Harvesters, of which the following is a full, clear, and exact description, reference being had to the accompanying drawings, making part of this specification.

My invention relates to a grain binding harvester in which the grain is bound upon an inclined elevating table on the grain side of the driving wheel, and in which, also, a revolving annular track or rim is employed, upon which the stubble side of the machine is carried and through which the bundles are discharged, and it consists in a novel manner of connecting the main frame of the machine with the revolving annular track or rim, for adapting said frame to be adjusted in height; in a roller frame interposed between the adjustable main frame and the open rim, and connecting the frame with the main driving or master wheel revolving within the rim; in the manner of combining the main and roller frames with the driving or master wheel actuated by the revolving annular track, whereby, while the main frame is adjustable in height relatively to said master wheel, the working relation of the latter to the revolving annular track or rim remains undisturbed; in projecting the driver's foot board, which is supported by the gear-standard on the grain side of the revolving rim, though said rim to form a support for the seat standard and driver's seat, arranged on the stubble side of said rim, and in projecting the frame adjusting devices through or partly through said rim, adapting them to be conveniently operated by the driver in his seat on the stubble side of the rim; in supporting the dumping tray upon arms or brackets projected through the open rim, and in the construction and arrangement of said dumping tray and of the devices for retracting, locking and releasing the same, and in certain details of construction and arrangement of parts hereinafter fully set forth In the accompanying drawings, Figure 1, is a plan view of so much of a harvesting machine as is necessary to show my invention, the open annular track or rim being broken away in part to show the connection of the main frame therewith. Fig. 2, is a view, in elevation, of the stubble side of the machine. Fig. 3, is a perspective view of a portion of the tilting tray showing the means for suspending and operating the tray. Fig. 4, is a perspective view of the angular standard and portions of the main and binder frames with which the rear end of the roller frame is connected. Fig. 5, represents a transverse section through the lower portion of the open rim, showing the drive or master wheel, a portion of the main frame, its supporting angular standard and means for adjusting said frame in elevation. Fig. 6, is a side elevation showing a modification of the roller frame and of the manner of connecting the same with the main frame and drive or master wheel. Fig. 7, is a perspective view similar to Fig. 4, showing the manner of connecting the roller frame constructed as shown in Fig. 6, with the main frame. Fig. 8, represents the levers for tilting the main frame and adjusting the reel, and the segmental rack standard supporting said levers in section, with a portion of the tumbling shaft for adjusting the reel. Fig. 9, is a perspective view of so much of the machine as is necessary to show the arrangement of the parts, and Fig. 10, is a similar view showing the modifications referred to in the description of Figs. 6 and 7.

The main frame of the machine is composed of front and rear transverse sills A and A', respectively and longitudinal bars connecting said sills constituting the usual rectangular frame, and upon the inner end of this rectangular frame, adjacent to the open rim of the machine is secured the inclined binder frame composed of longitudinal bars B and B', the latter being supported upon and above the sills A and A', in standards $B^2$ and $B^3$, and inclined transverse bars C, C, connecting the bars B and B', and upon which, in practice, the inclined elevating binder table is secured. To the forward end of the inclined binder frame is secured the binder gear-standards C' provided with horizontal tubular arms $C^2$ and $C^3$, in which the knotter-actuating and needle shafts have their bearings, said arms projecting rearwardly from the standard, one over and the other under the binder frame or table. A driver's foot board $A^2$, and a longitudinal bar $A^3$, for the support of the pickers or gatherers, and connected at its forward end with the foot board, are connected with the gear-standard C', and binder frame by suitable arms or brackets $a$, $a'$, the arrangement being similar to that shown and described in Letters Patent granted to me April 24, 1883, No. 276,448.

To the lower face of the platform sill A, is secured the horizontal arm E, of an angular bracket, the upright or standard portion E', of which is formed in an arc of a circle and slides in and serves as the guide for a sleeve F, on which the axle F', of the master or main driving wheel G, is formed, or to which said axle is secured, the standard being made adjustable up and down in said sleeve for varying the height of the main frame. The segment standard E', is formed in an arc of a circle of which the secondary shaft $d$, see Fig. 2 which has its bearings in the rear standard $B^2$, is the center, and the standard E', can, therefore, be adjusted in the sleeve F, without varying the distance between the axle F', and the secondary shaft $d$. A sprocket wheel G', is secured to the hub of the master wheel G, and serves through a drive chain $G^2$, and a sprocket wheel on the secondary shaft $d$, to impart motion to the latter, from which, motion is communicated to the main binder gear shaft $d'$ and to the platform carrier, cutter bar, reel and other operative parts of the machine in any usual manner.

The master wheel G, works within an open annular track or rim H, and is provided with a broad flat tread or rolling surface $g$, that rolls upon the smooth surface of a rail or annular flange $h$, formed upon the inner face of the open rim H, which is of sufficient diameter to permit the passage of the grain through it, and has a width of tread sufficient to prevent it from sinking too deeply into the ground.

The master wheel G, is provided with flanges $g'$, $g'$, which prevent its lateral displacement from the rail $h$, and has a gear $g^2$, formed on one side of its rolling surface $g$, the teeth of said gear intermeshing with the teeth of a gear $h'$, formed on the corresponding side of the rail $h$, of the open rim. The gears of the rim and wheel are so formed that their pitch lines will be even with the contact surface of the rail $h$, and tread $g$, and the distance between the points of the teeth of one and the bottoms of the spaces between the teeth of the other is such as to cause the rolling surface or tread $g$, of the wheel to bear solidly on the surface of the rail $h$, and the gears may consequently be made with teeth of small size, simply serving to prevent the rolling surface of the wheel G, from slipping on the rail $h$.

I represents a longitudinal bar fixedly connected near its forward end to a short standard I', on the driver's foot board and at or near its rear end also fixedly connected to an angular rod or bracket $I^2$, secured by one of its arms to the inner end of a sill A', and by its other arm, $I^3$, to the bar B', or top of the rear standard $B^2$, upholding said bar above the sill.

The ends of the bar I, are provided with freely revolving flanged rollers $I^4$, $I^5$, which rest and roll upon the rail $h$, of the open rim, with their flanges $i$, $i$, on opposite sides of said rail for preventing lateral displacement of the rollers.

In the construction shown in Figs. 1, and 9, the bar I, is secured near the center of its length to the upper end of the segment E', and being connected with the foot bar and rear main frame sill, as explained, becomes a rigid attachment to the main frame. The forward end of the bar I, is bent upward, bringing the roller attached thereto above the horizontal diameter of the rim H, and the rear end of said bar is bent downward or depressed below said horizontal diameter sufficiently to bring the axes of the two rollers both below or on one side of a line drawn diametrically through the rim parallel with a line passing through the axes of the two rollers. In other words, the distance between the opposite, outer faces of the rollers $I^4$ and $I^5$, is slightly less than the interior diameter of the rail $h$, on which said rollers rest and move, an arrangement which serves to permit adjustment of the rollers of said bar upon the rim from one side to the other of the diametric line referred to without danger of disengaging the flanges of said rollers from the rail $h$, thereby permitting the adjustment in height of the main frame sufficient for the ordinary purposes of such adjustment.

In Figs. 6, 7, and 10, a modification is shown in the form of the bar I, and in the manner of connecting it with the frame, whereby this bar and the rollers are made to preserve a fixed relation to the open rim, and the main frame is adapted to be adjusted relatively to said bar and the open rim in such manner as to give a greater range of adjustment to the main frame than under the construction above described. The bar I, in this construction has its forward end bent upward into a vertical position, and said portion passes up through a sleeve on a bracket $A^6$, secured to the foot board $A^2$, being adapted to slide therein. The rear end of the bar is provided with a sleeve that surrounds and is adapted to slide upon the vertical portion of an angular rod or standard $I^6$, secured by its vertical arm to the sill A', and by the horizontal arm to the bar B', or on its rear supporting standard $B^2$. In this construction, also, the bar I, instead of being connected with the segment E', is rigidly connected, near the center of its length with the upper end of the axle sleeve F, in which said segment is adjusted. Brace rods $i'$, $i''$, extend obliquely upward from the lower end of the sleeve F, to near the ends of the bar I, and serve to stiffen and strengthen the latter and its connection with the axle sleeve. The adjustment in height, of the main frame, under either of the constructions above described, is effected by means of a shaft or windlass K, mounted in suitable bearing standards on the main frame, and from which a chain $k^2$, extends up to a hook or eye at the upper end of the axle sleeve F, a second chain $k^3$, or chains and rods serving to connect the shaft with the grain-wheel bracket for adjusting the outer end of the main frame, by an arrangement of parts similar to that described in the patent to me above referred to, the shaft K, being provided with worm wheel K', with which a worm or screw $k'$, on an upright shaft $K^2$, engages, said shaft being provided with a hand wheel $k$, on its upper end for actuating it, as described in said patent, except that the upright shaft $K^2$, is set at a somewhat greater inclination outward to adapt it to pass through the open rim for bringing the hand wheel on its upper end within convenient reach of the driver in his seat on the stubble side of said rim. By rotating the shaft $K^2$, in the proper direction, when it is desired to raise the main and binder frames, the shaft K, will be made to wrap the chains $k^2$ and $k^3$, upon itself and thus, by drawing upon the axle sleeve and grain wheel bracket referred to, to lift the frame, the guiding, segmental standard E', moving up through the axle sleeve F. When the shaft $K^2$, is rotated in the opposite direction the weight of the frame and its attachments serve to unwrap the chains and thereby allow said frame to descend. Under either of the constructions described, the weight of the inner end of the frame and its attachments, is at all times on the axle sleeve F, and serves to hold the master wheel down on the rail or track $h$, of the open rim with sufficient force to insure the rotation of said wheel when the machine is moved.

The driver's foot board $A^2$, extends through the open rim near its forward portion, and about in the plane of its horizontal diameter, and affords not only a support for the forward end of the roller-frame bar I, as explained, but, also for the driver's seat M', located on the stubble side of said rim, on an upwardly and outwardly inclined standard M, attached at its foot to the outer end of said foot board. The tongue $A^5$ is pivoted in the standard which supports the forward end of the binder frame standard and has connected with it, in advance of its pivotal connection with the standard on the main frame, a link $L^2$, which at its upper end is connected with the short arm of an angular or bell-crank lever L, pivoted upon a segmental standard L', secured to the driver's foot board, an arrangement adapting the main frame to be tilted on the carrying wheel, in a manner well understood. On the opposite side of the segmental standard L', from the lever L, is a second lever $L^3$ which is connected with a rock shaft $L^4$, provided at its outer end with a crank arm, through which, connection is made with the reel for adjusting it, as described in Letters Patent No. 335,610, granted to me February 9, 1886.

To adapt the levers L and $L^3$, to be operated through the open rim, by the driver seated on the stubble side of said rim, the segmental standard L', is set obliquely to the foot board, in such manner that the handle portions of the levers L and $L^3$, will project through or partly through the open rim, and portion $l$, of the shaft $L^4$, having its bearing in said standard L', in order to accommodate the oblique arrangement of the latter, is connected with the main or crank arm portion, through which the adjustment of the reel is effected, by a universal joint $l^3$. The lever $L^3$, for rocking the tumbling shaft $l^3$ $L^4$, and adjusting the reel is keyed to the portion $l$, while the lever L, for tilting the frame is journaled loosely on said portion $l$, of the tumbling shaft.

By extending the foot board $A^2$, through the open rim as explained, it serves not only as a support for the driver's seat arranged outside of said rim as explained, but also for a foot lever or treadle $n^3$, for actuating the dumping-tray, tripping device. The dumping-tray consists, by preference, of a series of light, curved rods or fingers N, connected at their inner ends with a longitudinal bar or rock-shaft N', similar to that described in Letters Patent granted to me June 12, 1882, No. 259,329, except that I prefer to arrange the bar N', obliquely to the path of the machine. To effect this the supporting bracket or strap $n$, in which the forward end of the bar N', is journaled, is made longer than the rear bracket $n'$, the former projecting through the rim while the latter terminates on the inner side of or within the rim.

The supporting brackets or straps are secured to the upper ends of the inclined transverse binder-frame bars C, and are provided, at their outer ends with eye bearings for the pivots of the longitudinal bar N', which by the construction described is made to extend obliquely through or partly through the open rim, from the outer side thereof in front, to, or toward, the inner side of said rim at its rear end. This arrangement serves to incline the fingers N, toward the rear, facilitating the withdrawal or escape of the latter from the bundles in the forward movement of the machine, an action which will be further facilitated by setting the fingers inclining rearward and obliquely to the bar N, as in Patent No. 259,329, above referred to.

The bar N' is adapted to slide longitudinally in its supporting brackets and is provided at or near its ends with inwardly-projecting angular fingers $n^4$, $n^4$, the outer ends of which pass under and are held by the brackets when the tray is in position for receiving the bundles, and are released for allowing the tray to tilt and dump its load by drawing the tray forward. This is accomplished by connecting the bar N', through a link $n^2$, with the lever $n^3$, the latter being operated by the driver. The bar N', is further connected by means of a coiled spring $n^5$, with a downwardly projecting arm $n^6$, attached to the bracket $n'$, said spring extending from the bar N', obliquely downward and rearward, and serving by its tension not only to retract the tray after its load has been discharged, but also to draw it rearward, when released by the driver, for again engaging the angular fingers $n^4$, with the brackets $n$, $n'$, and thereby holding the tray in position to receive a new load.

The bar I, with its rollers working within the open rim, under either of the two constructions above described, for convenience in distinguishing it, I term the roller bar or frame. Parts of the machine not particularly described may be constructed and arranged as described in my other patents herein referred to, or in any usual or preferred manner.

Having now described my invention, I claim as new—

1. The combination of the frame of the machine with the open rim and the driving wheel, engaging therewith, the shaft on which said drive wheel is mounted, provided with a grooved sleeve, and a curved guiding standard on the main frame, adjustable in said sleeve, substantially as described.

2. The combination of the frame of the machine with the open rim and the drive wheel engaging therewith mounted upon a shaft carrying a sleeve in which is adjusted a standard on the frame of the machine, and means for adjusting said frame on said drive wheel, substantially as described.

3. The combination of the open rim, the segment standard secured to the frame, the sleeve in which said standard slides, the drive wheel supported on said sleeve, and adjusting mechanism connecting the segment and bracket to raise and lower the frame upon the drive wheel, substantially as described.

4. The open rim in combination with the driving wheel engaged therewith, the latter secured through a sleeve to a standard on the main frame, formed in the arc of a circle of which the secondary shaft actuated through said drive wheel is the center, whereby said frame is adapted to be adjusted relatively to said open wheel and driving wheel without disturbing the relation of the driving wheel to the secondary shaft, substantially as described.

5. The combination of the open rim, the segment standard secured to the frame, the axle sleeve secured on said standard, the drive wheel supported thereon, the chain shaft and its hand wheel shaft and chains connecting both the grain wheel and drive wheel brackets with the chain shaft, to be wound or unwound thereon to adjust the height of the finger bar and platform from the ground, substantially as described.

6. The combination with the open rim, of the curved standard on the frame of the machine, the driving and supporting, combined roller and gear wheel, relatively to which said standard is adjustable, and the bar I, provided with steadying rollers and connected with said standard, substantially as described.

7. The combination of the open rim, the drive wheel arranged to roll upon the inner surface of the rim, the roller frame, the segment standard, the main frame and standards secured thereon, upon which the ends of the roller frame are supported and allowed to move substantially as described.

8. The combination of the open rim, the roller bar or frame arranged within the rim, and the inclined binder frame and main frame adjustably connected with said roller bar or frame and a dumping-tray connected with the main and binder frame by brackets passing through the rim above the roller frame substantially as described.

9. The open rim through which the grain is carried to the stubble side thereof from the platform, in combination with the driver's seat arranged upon the stubble side of the open rim upon a support projecting through said open rim, substantially as described.

10. The driver's foot board arranged within the periphery of and projecting within or through the open drive wheel or rim, in combination with a steadying roller or roller bar secured thereto, substantially as described.

11. The combination of the open wheel or rim, the inclined binder table arranged upon the grain side of the rim, the driver's foot board projected through the rim and the driver's seat secured to said foot board upon the stubble side of the rim, substantially as described.

12. The open rim, in combination with the main frame arranged upon the grain side, and the driver's seat arranged upon the stubble side thereof, and the lever or levers projected through or partly through the rim, to be operated from the driver's seat, substantially as described.

13. The combination of the frame or foot board sill, a shaft for adjusting the height of the reel, secured parallel thereto, the hand levers secured to a shaft arranged obliquely to said reel adjusting shaft, the said shafts being coupled together by a universal joint, substantially as described.

14. The combination of the frame, the reel adjusting rock-shaft, the hand lever shaft for operating it, arranged at an angle thereto, the double segment rack and the tongue adjusting lever journaled to turn freely upon or independently of said hand lever shaft, substantially as described.

15. The combination of the main frame, a dumping tray hinged thereto, and dogs arranged to slide longitudinally with the tray, to engage with and be disengaged from the main supporting frame, substantially as described.

16. The combination of the main frame, the dumping tray hinged thereto, and arranged to slide longitudinally and be operated upon, substantially as and for the purpose described.

17. The combination of the main frame which supports the tray, a longitudinally sliding, dumping tray hinged thereto, and connected therewith by locking dogs, and a retracting spring, connecting the stationary supporting frame in the manner described so that the tray, when released, will be dumped by the weight of the bundles, and will be raised and have a longitudinal movement imparted to it by the spring upon the discharge of its load, substantially as described.

18. The combination of the tray supporting brackets on the binder frame, the longitudinal rail of the dumping tray hinged thereto, to slide longitudinally thereon, the retracting spring, the dogs secured to the rail to pass beneath the brackets, and the rod connecting the lever on the foot board and the end of the tray, substantially as described.

In testimony whereof I have hereunto set my hand this 23d day of April, A. D. 1883.

LEWIS MILLER.

Witnesses:
N. N. LEOHNER,
J. LEET YOUNG.